(12) United States Patent
Chang

(10) Patent No.: US 7,828,109 B2
(45) Date of Patent: Nov. 9, 2010

(54) TRANSMISSION AND STEERING SYSTEM FOR DOUBLE-HEAD VEHICLES

(76) Inventor: Shih-Chieh Chang, 84 Gungiuan Rd., Taishan, Taipei Hsien (TW)

( * ) Notice: Subject to any disclaimer, the term of this patent is extended or adjusted under 35 U.S.C. 154(b) by 9 days.

(21) Appl. No.: 12/467,410

(22) Filed: May 18, 2009

(65) Prior Publication Data
US 2009/0288904 A1 Nov. 26, 2009

(30) Foreign Application Priority Data
May 20, 2008 (TW) ............................... 97118496 A

(51) Int. Cl.
*B62D 7/00* (2006.01)
(52) U.S. Cl. .................. 180/400; 180/411; 180/321; 246/167 R; 246/1 C
(58) Field of Classification Search ............... 180/400, 180/411; 280/99, 100, 321; 246/167 R, 246/1 C, 2 R, 4, 6, 2 E
See application file for complete search history.

(56) References Cited

U.S. PATENT DOCUMENTS

| | | | | |
|---|---|---|---|---|
| 2,384,890 A | * | 9/1945 | Coldwell | 180/329 |
| 2,406,261 A | * | 8/1946 | Sprinkel | 180/322 |
| 2,791,915 A | * | 5/1957 | Merry | 74/562.5 |
| 2,848,246 A | * | 8/1958 | Ruf | 180/409 |
| 3,693,744 A | * | 9/1972 | Horn et al. | 180/53.1 |
| 3,814,204 A | * | 6/1974 | Larkin | 180/89.19 |
| 4,911,261 A | * | 3/1990 | Conley | 180/322 |
| 5,952,730 A | * | 9/1999 | Haller et al. | 307/10.1 |
| 7,127,341 B2 | * | 10/2006 | Whang | 701/43 |
| 7,137,862 B2 | * | 11/2006 | Arnold | 446/445 |
| 7,705,743 B2 | * | 4/2010 | Barone et al. | 340/682 |
| 7,715,956 B2 | * | 5/2010 | Bryant | 701/19 |
| 7,729,818 B2 | * | 6/2010 | Wheeler et al. | 701/19 |

\* cited by examiner

*Primary Examiner*—Lesley Morris
*Assistant Examiner*—Tashiana Adams
(74) *Attorney, Agent, or Firm*—Guice Patents PLLC

(57) ABSTRACT

The present invention discloses a transmission and steering system of a double-head vehicle, comprising a first steering wheel; a front wheel group; a first signal acquisition and transceiver device which can output steering information according to the steering angle of the first steering wheel; a first motor group; a second signal acquisition and transceiver device which can receive the steering information output from the first signal acquisition and transceiver device; a rear wheel group; and a second motor group; such that through the aforementioned structure, when the first steering wheel is turned, the first motor group may be controlled by the first steering wheel to drive the front wheel group to turn and in the mean time, the second signal acquisition and transceiver device may receive the steering information and transmit it to the second motor group to drive the rear wheel group.

17 Claims, 7 Drawing Sheets

TRANSMISSION AND STEERING SYSTEM FOR DOUBLE-HEAD VEHICLES

FIELD OF THE INVENTION

The present invention relates to a transmission and steering system of a double-head vehicle, and in particular to a vehicle which separates steering wheels and driving wheels, and thus the wheels providing power do not provide steering, such that the double-head vehicle comprises a middle driving wheel group, front and rear steering wheel groups, and a coupling mechanism for the two steering systems; an electric connection having a first signal acquisition and transceiver device which is disposed on the front wheel group of the vehicle, a second signal acquisition and transceiver device which is disposed on the rear wheel group of the vehicle, such that when the steering wheel is turned, the electric motor may receive the steering information transmitted from the first signal acquisition and transceiver device to drive the rear wheel group; and an mechanical connection replacing the signal acquisition and transceiver device for the steering angle with gears, linkages, and transmission shafts, which may also transmit power and replace the motor power in the electric coupling mechanism.

BACKGROUND OF THE INVENTION

The general configuration of wheels has been followed over the last hundred years, i.e. a pair of wheels at the front and rear sides, respectively, forming a rectangular configuration. The front pair of wheels controls steering and the rear one is responsible for power transmission. Also, every wheel in the rectangular configuration of wheels can provide supporting function of the vehicle. Take a sedan for example; its front part is generally provided with an engine and handling system, middle part has the compartment for passengers, and rear part is disposed with gasoline tank and luggage compartment.

For a general rear-wheel driving vehicle undergoing a turning process, since rear wheels are fixed without turning, the common center of turning will fall on the co-axis of rear wheels, such that the turning radius is increased.

When a vehicle goes straight without turning, four wheels would have identical rotation speed. When a vehicle with four wheels is turning, however, four wheels must have different rotation speeds; outer wheels must rotate faster than inner ones. Two of four wheels are usually power wheel (driving wheels), and the one in the far end has to rotate faster and the other one rotates slower or it will slide rather than rotate. Therefore, a differential is needed. Apart from the two driving wheels, the other two are free wheels (driven wheels); the one in the far end will be driven to rotate faster and the other one is driven slower. Therefore, no differential is required without the concern of wear due to sliding.

However, a general rear-wheel driving vehicle undergoing a turning process, since rear wheels are fixed without turning, the common center of turning will fall on the co-axis of rear wheels, such that the turning radius is increased.

A double-head vehicle can have an individual engine for each head or a common engine for both heads. Employing two engines can certainly raise cost, but the requirement of transmitting power to front/rear wheels, four-wheel driving mechanism for example, is complicated and therefore may carry high cost if the mode of sharing a common engine is adopted. Regardless of the two-engine or single engine mode, rear and front wheels have both to be power wheels; therefore, a differential is required for both pairs of wheels. Moreover, a coupling mechanism is required to switch between vehicle head and vehicle tail, i.e. vehicle head and vehicle tail changing sides. The mechanism demands the coupling and coordination of transmission and steering system. Consequently, the cost of the two aforementioned modes of a double-head vehicle is high.

To overcome the drawbacks of the aforementioned rear-wheel drive vehicle, the ROC patent No. 474282, Novel Vehicle Four-wheel Drive Steering System, discloses a novel steering system for four-wheel drive vehicles, which during low speed running, front and rear wheels are revolving in opposite phase, and at medium and high speed running, front and rear wheels are revolving in same phase, comprising a front wheel steering mechanism, a steer core mechanism, and a rear wheel steering mechanism. The patent is characterized in that the central rotating shaft transmits steering wheel angle to the rocker of the steer core mechanism to drive the output rod to rotate as the first input; the stepper motor drive the rotary arm worm gear of the steer core mechanism according to vehicle speed so as to rotate the rotary arm as the second input; when the steer core mechanism receives these two inputs, it drives rocking arm, extendable rod, and output rod to generate an output displace to rear wheel steering mechanism to drive the rear wheels to turn. However, there are a number of drawbacks observed in the aforementioned patent. (1) The steering of the front wheels and rear wheels is controlled by a mechanical mechanism, and thus a high cost is involved; (2) the steering of front wheels and rear wheels are not necessary symmetrical; and (3) it requires a vehicle speed sensor to enable front wheels and rear wheels steering in opposite phase at low speed, and front wheels and rear wheels steering in same phase at medium/high speed, leading to an even more complicated structure. Also, this novel four-wheel steering system requires an expensive differential for both front wheels and rear wheels. Moreover, a coupling mechanism is required to switch between vehicle head and vehicle tail, which demands the coupling and coordination of the transmission and steering system, also leading to a high cost. It is therefore necessary to provide new designs to overcome these drawbacks of the aforementioned.

SUMMARY OF THE INVENTION

In view of the foregoing shortcomings of the prior art, the inventor of the present invention based on years of experience in the related industry conducted extensive researches and experiments, and finally invented a transmission and steering system of a double-head vehicle accordance with the present invention.

The primary objective of the present invention is to provide a transmission and steering system of a double-head vehicle, wherein the vehicle is disposed with a first acquisition and transceiver device in front wheel group and a second acquisition and transceiver device in rear wheel group, such that when the steering wheel is turned, an electric motor may receive the steering information transmitted from the first acquisition and transceiver device to drive the rear wheel group.

Another objective of the present invention is to provide a transmission and steering system of a double-head vehicle, wherein a mechanical connection may replace the acquisition and transceiver device for steering information with gears, linkages, and transmission shafts, and may also replace the motor power of electric connection to transmit power. Also, the present invention is further disposed with a middle power wheels to separate steering wheels and power wheels, such that front wheels and rear wheels do not have the function of power wheels and thus no expensive differential and complicated bilateral transformer is required.

A further objective of the present invention is to provide a transmission and steering system of a double-head vehicle further having a middle wheel group, which is disposed between front wheel group and rear wheel group, such that when the vehicle is turning, the extension line of the middle wheel group may be the common center to shorten the turning radius.

In order to achieve the objects described above, the present invention provides a transmission and steering system of a double-head vehicle, comprising a first steering wheel to control the front wheel group described later; a front wheel group which is connected with the first steering wheel through a four-bar linkage; a first signal acquisition and transceiver device which is coupled with the turning center of the four-bar linkage and may output the steering information according to the steering angle of the first steering wheel; a first motor group coupled with the front wheel; a second signal acquisition and transceiver device which may receive the steering information output from the first signal acquisition and transceiver device; a rear wheel group which is coupled with the second signal acquisition and transceiver device and has a second four-bar linkage; and a second motor group coupled with the second four-bar linkage, the second signal acquisition and transceiver device, and the rear wheel group; such that the first steering wheel is turned, the first motor group may be controlled by the first steering wheel to drive the front wheel group to turn and in the mean time, the second signal acquisition and transceiver device may receive the steering information and transmit it to the second motor group to drive the rear wheel group.

In order to achieve the objects described above, the present invention provides a transmission and steering system of a double-head vehicle, comprising a first steering wheel to control the front wheel group described later; a first three-way gear group which is coupled with the first steering wheel and can connect and drive the first steering wheel, the first three-way axle described later, and the transmission shaft described later in three axial directions; a first three-way axle whose one axle is coupled with the first three-way gear group and which has a turning center; a front wheel group which is connected with the first steering wheel through the other two axles of the first three-way axle; a first motor group coupled with the front wheel group; a transmission shaft whose one end is coupled with the first steering wheel and the first three-way axle; a second steering wheel controlling the rear wheel group described later; a second three-way gear group which is coupled with the second steering wheel and can connect and drive the second steering wheel, the second three-way axle described later, and the transmission shaft described later in three axial directions; a second three-way axle whose one axle is coupled with the second three-way gear group and which has a turning center; a rear wheel group which is connected with the second steering wheel through the other two axles of the second three-way axle; a second motor group coupled with the rear wheel group; such that when the first steering wheel is turned, the first motor group may be controlled by the first steering wheel to drive the front wheel group to turn and in the mean time, the transmission shaft may rotate and transmit to the second motor group and to drive the rear wheel group.

BRIEF DESCRIPTION OF THE DRAWINGS

The present invention can be more fully understood by reference to the following description and accompanying drawings, in which.

DETAILED DESCRIPTION OF THE INVENTION

Figure 1:
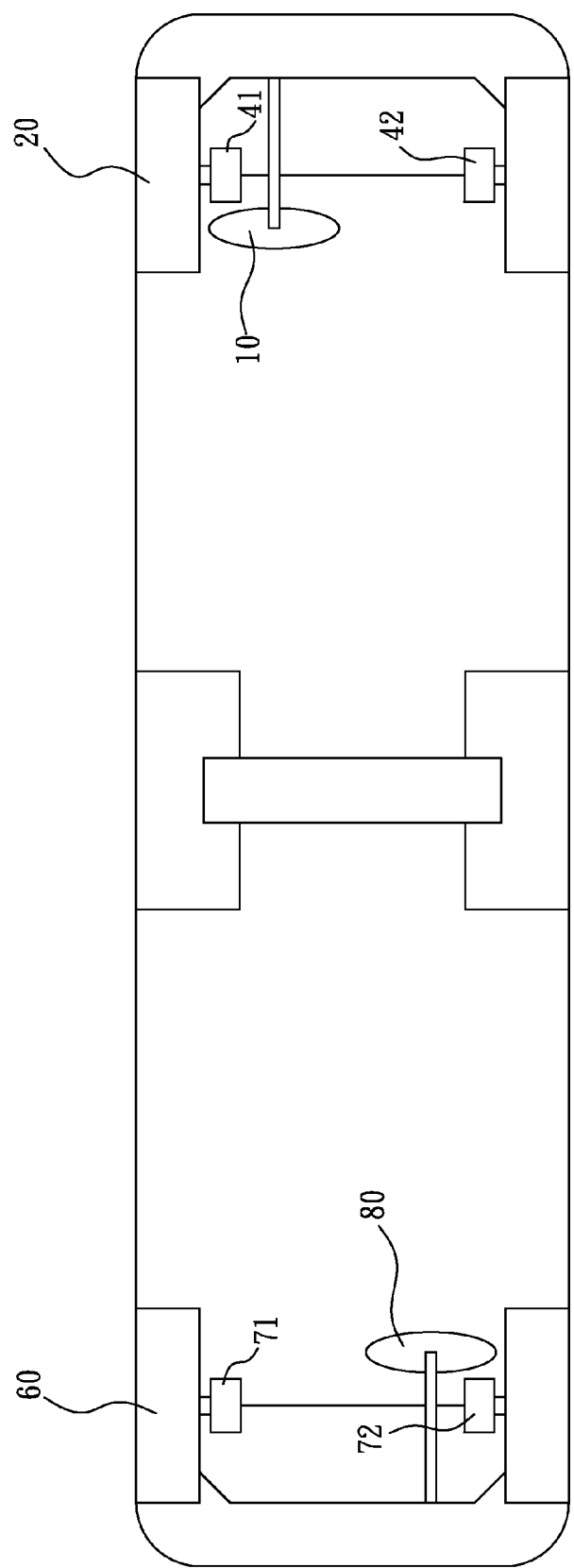
FIG. 1 schematically illustrates the top view of a double head lowrider vehicle according to the present invention.
Figure 2:
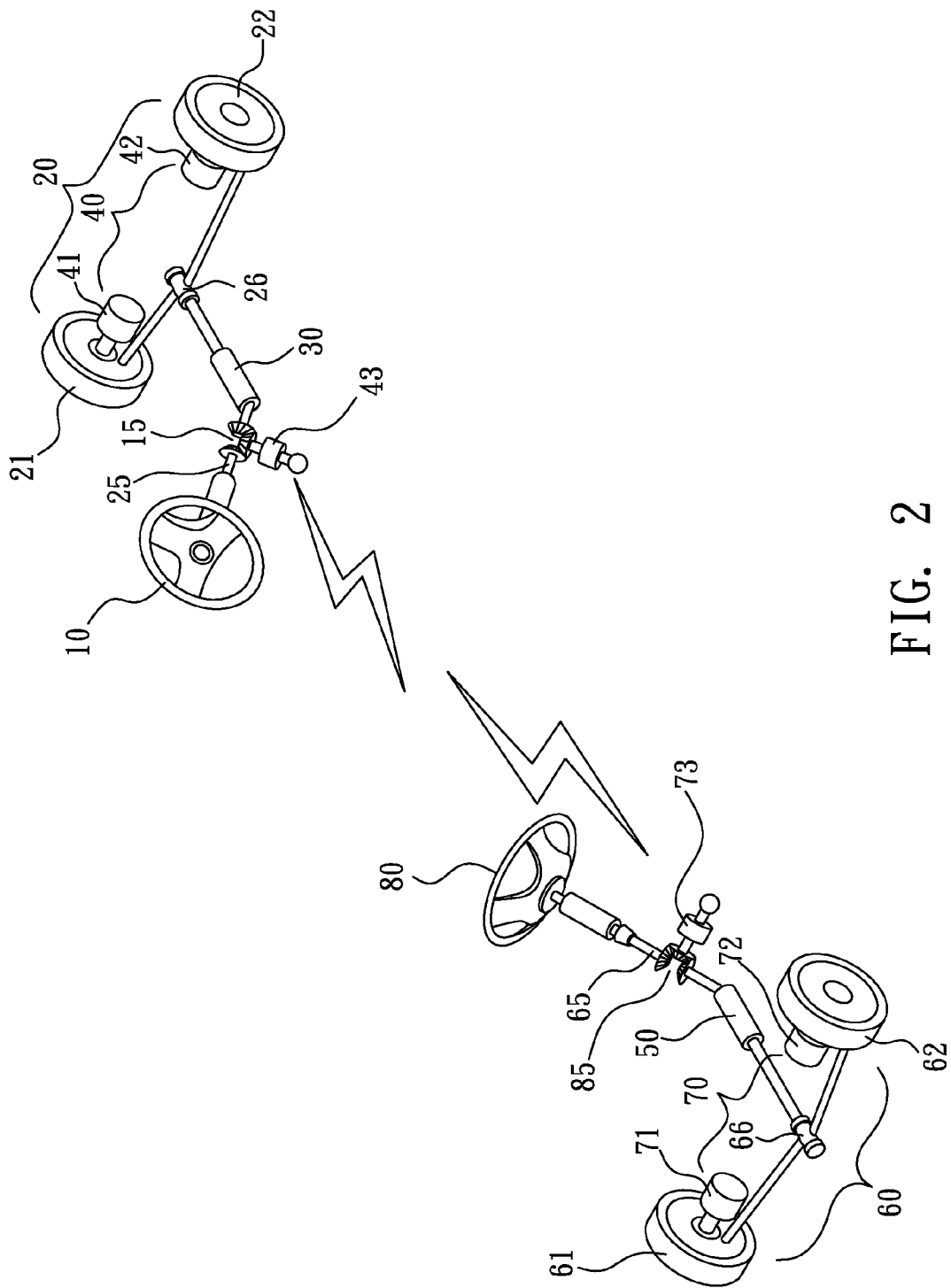
FIG. 2 schematically illustrates an enlarged local view of the first and the second four-bar linkages according to the present invention.
Figure 3:
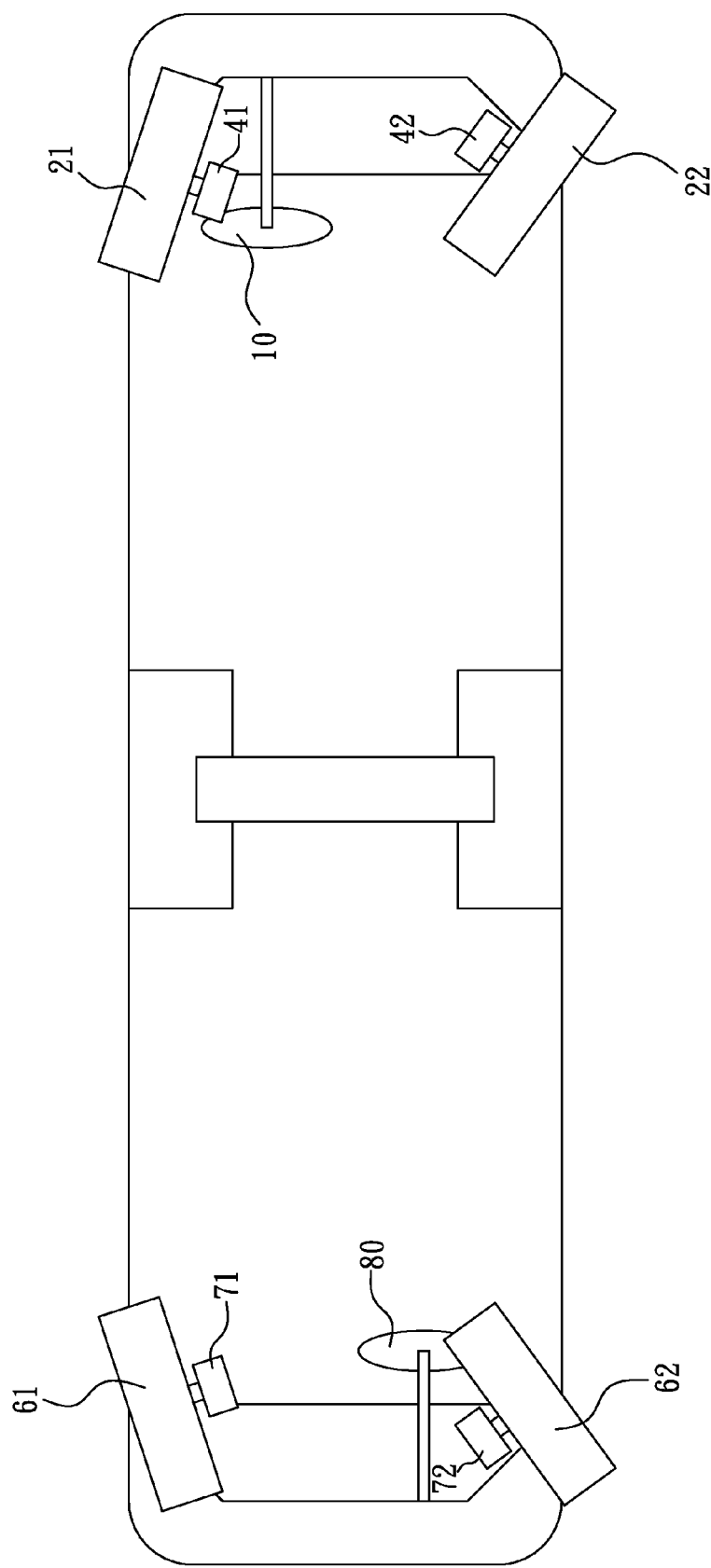
FIG. 3 schematically illustrates the steering of front wheel group and rear wheel group in same phase according to the present invention.
Figure 4:
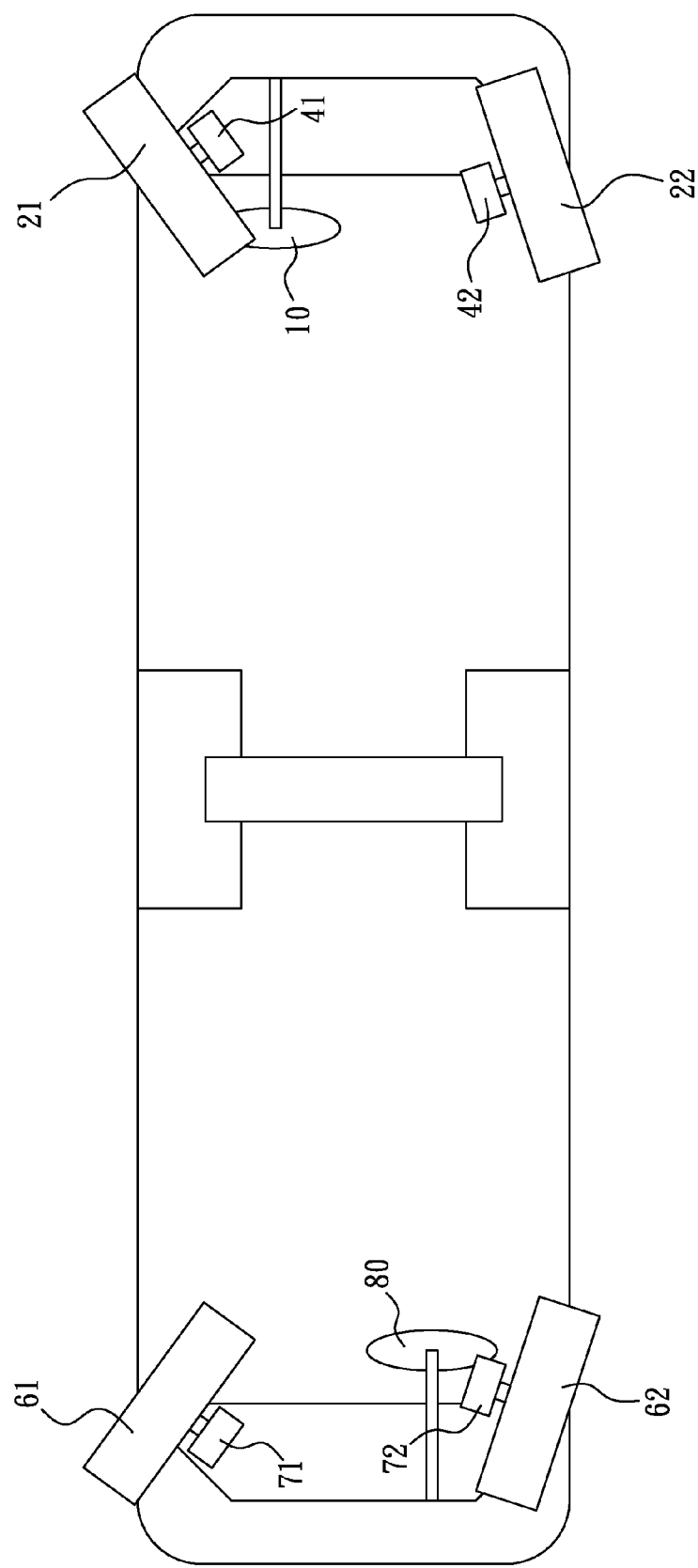
FIG. 4 schematically illustrates the steering of front wheel group and rear wheel group in opposite phase according to the present invention.

Referring to FIGS. 1 to 4, wherein FIG. 1 schematically illustrates the top view of double head lowrider vehicle according to the present invention; FIG. 2 schematically illustrates the enlarged local view of a first and second four-bar linkages according to the present invention; FIG. 3 schematically illustrates the steering of front wheel group and rear wheel group in same phase according to the present invention; FIG. 4 schematically illustrates the steering of front wheel group and rear wheel group in opposite phase according to the present invention.

As shown in the aforementioned figures, a double-head lowrider vehicle, for example but not limited to electrical vehicle, comprises a first steering wheel 10; 1 a first three-way gear group 15; a front wheel group 20; a first signal acquisition and transceiver device 30; a first motor group 40; a second signal acquisition and transceiver device 50; a rear wheel group 60; and a second motor group 70, wherein the first steering wheel 10 may control the front wheel group 20, which is a prior and will not be discussed further.

The first three-way gear group 15 coupled with the first steering wheel 10 may connect and drive the first steering wheel 10 in three axial directions.

The front wheel group 20 further comprises two wheels 21 and 22, which are connected with the first steering wheel 10 through the first four-bar linkage 25, which has a turning center 26, wherein the first four-bar linkage 25 may transmit the information of steering angle of the first steering wheel 10 to the front wheel group 20, which is a prior art and will not discussed further.

The first signal acquisition and transceiver device 30 is coupled with the turning center 26 of the first four-bar linkage 25 and may transmit steering information to the second signal acquisition and transceiver device 50 according to the steering angle of the first steering wheel 10, and the first signal acquisition and transceiver device 30 transmits the steering information through, for example but not limited to, wire or wireless manner, to the second signal acquisition and transceiver device 50. Alternately, the first signal acquisition and transceiver device 30 may receive the steering information transmitted from the second signal acquisition and transceiver device 50 through, for example but not limited to, wire or wireless manner.

The first motor group 40 coupled with the front wheel group 20 further comprises a first stepper motor 41 and a second stepper motor 42 to drive the steering of the two wheels 21 and 22 of the front wheel group 20, wherein the first motor 41 and second motor 42 are, for example but not limited to, servo motors. Furthermore, the first motor 41 and second motor 42 may be replaced with a motor 43 disposed under the first three-way gear group 15.

The second signal acquisition and transceiver device 50 may receive the steering information transmitted from the first signal acquisition and transceiver device 30, or the second signal acquisition and transceiver device 50 may also transmit the steering information to the first signal acquisition and transceiver device 30 through, for example but limited to, wire or wireless manner.

The rear wheel group 60 coupled with the second signal acquisition and transceiver device 50 further comprises two wheels 61 and 62, which are connect with second steering wheel 80 described later through the second four-bar linkage 65, which has a turning center 66, wherein the second four-bar linkage 65 is a prior art and will not discussed further.

The second motor group 70 coupled with the rear wheel group 60 further comprises a third stepper motor 71 and a fourth stepper motor 72 to drive the steering of the two wheels 61 and 62 of the rear wheel group 60, wherein the third motor 71 and fourth motor 72 are, for example but not limited to, servo motors.

Furthermore, a double-head lowrider vehicle according to the present invention further comprises a second steering wheel 80 and a second three-way gear group 85, wherein the second four-bar linkage 65 is connected with the rear wheel group 60 through the second three-way gear group 85 and may control the rear wheel group 60. Consequently, a double-head lowrider vehicle according to the present invention may achieve driving in both directions through the first steering wheel 10 or the second steering wheel 80. Furthermore, the third motor 71 and fourth motor 72 may be replaced with a motor 73 disposed under the second three-way gear group 85.

With reference to FIG. 3, the front wheel group 20 and the rear wheel group 60 may steer in same phase. For example, when a driver turns the first steering wheel 10, which will drive the first four-bar linkage 25, such that the first motor group 40 may drive the front wheel 20 to rotate; in the mean time, the first signal acquisition and transceiver device 30 at the turning center 26 of the first four-bar linkage 25 transmits the steering information of turning angle (or the number of turn) of the first steering wheel 10 to the second signal acquisition and transceiver device 50 through wire or wireless manner. The second signal acquisition and transceiver device 50 outputs the steering information to the second motor group 70, which then drives the rear wheel group 60 to rotate in a similar manner.

As shown in FIG. 4, the front wheel group 20 and rear wheel group 60 according to the present invention may steer in opposite phase. For example, when a driver turns the first steering wheel 10, which will drive the first four-bar linkage 25, such that the first motor group 40 may drive the front wheel 20 to rotate; in the mean time, the first signal acquisition and transceiver device 30 at the turning center 26 of the first four-bar linkage 25 transmits the steering information of turning angle (or the number of turn) of the first steering wheel 10 to the second signal acquisition and transceiver device 50 through wire or wireless manner. The second signal acquisition and transceiver device 50 outputs the steering information to the second motor group 70, which then drives the rear wheel group 60 to rotate in the opposite direction.

Furthermore, with reference to FIGS. 3 and 4, a driver may also turn the second steering wheel 80 in the opposite direction to control the vehicle, such that a double-head lowrider vehicle according to the present invention can achieve the aim of controlling at both different directions.

Figure 5:
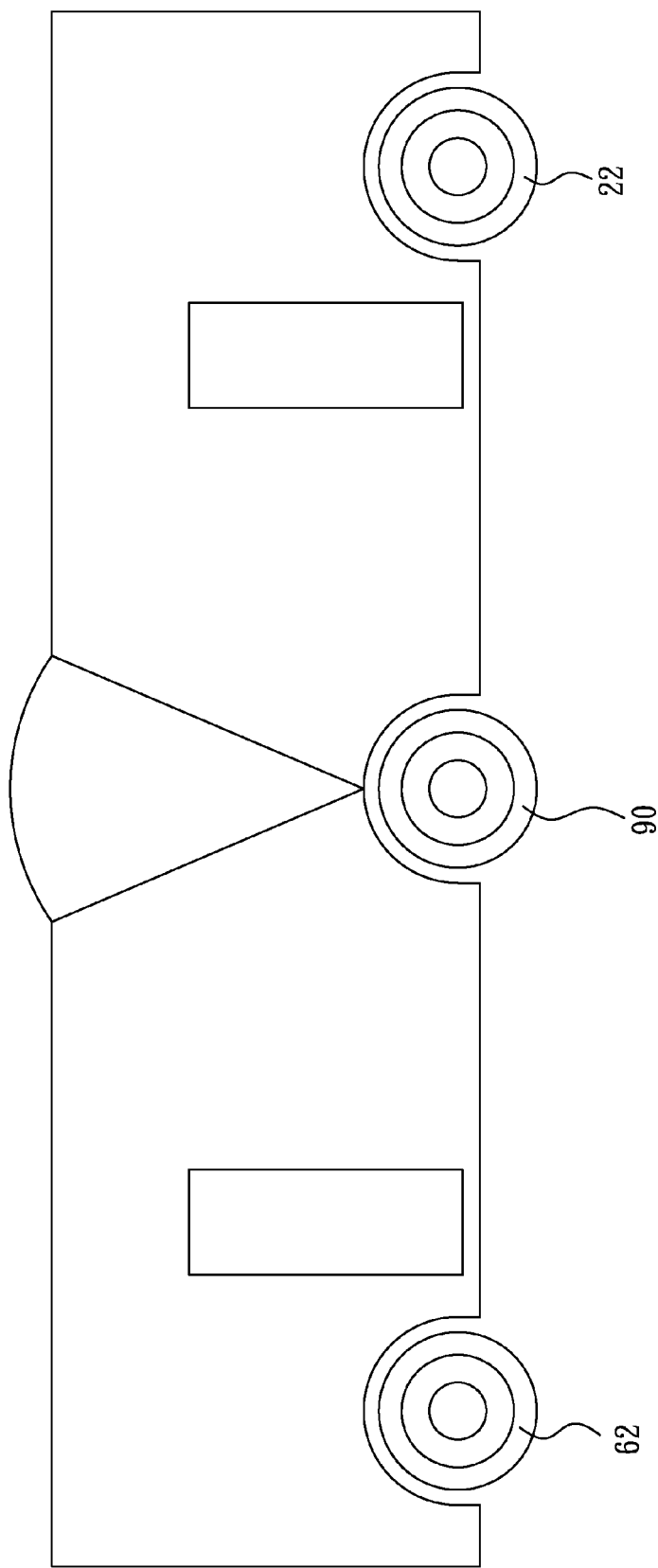
FIG. 5 schematically illustrates a transmission and steering system of a double-head vehicle according to the present invention a further comprises a middle wheel group.

With reference to FIG. 5, a double-head lowrider vehicle according to the present invention further comprises a middle wheel group 90, which is disposed between the front wheel group 20 and the rear wheel group 60 and which is connected with a power shaft 91 therebetween. Also, when a double-head lowrider vehicle according to the present invention is turning, the front wheel group 20, the middle wheel group 90, and the rear wheel group 60 have a common center at the extension line of the middle wheel group 90.

Figure 6:
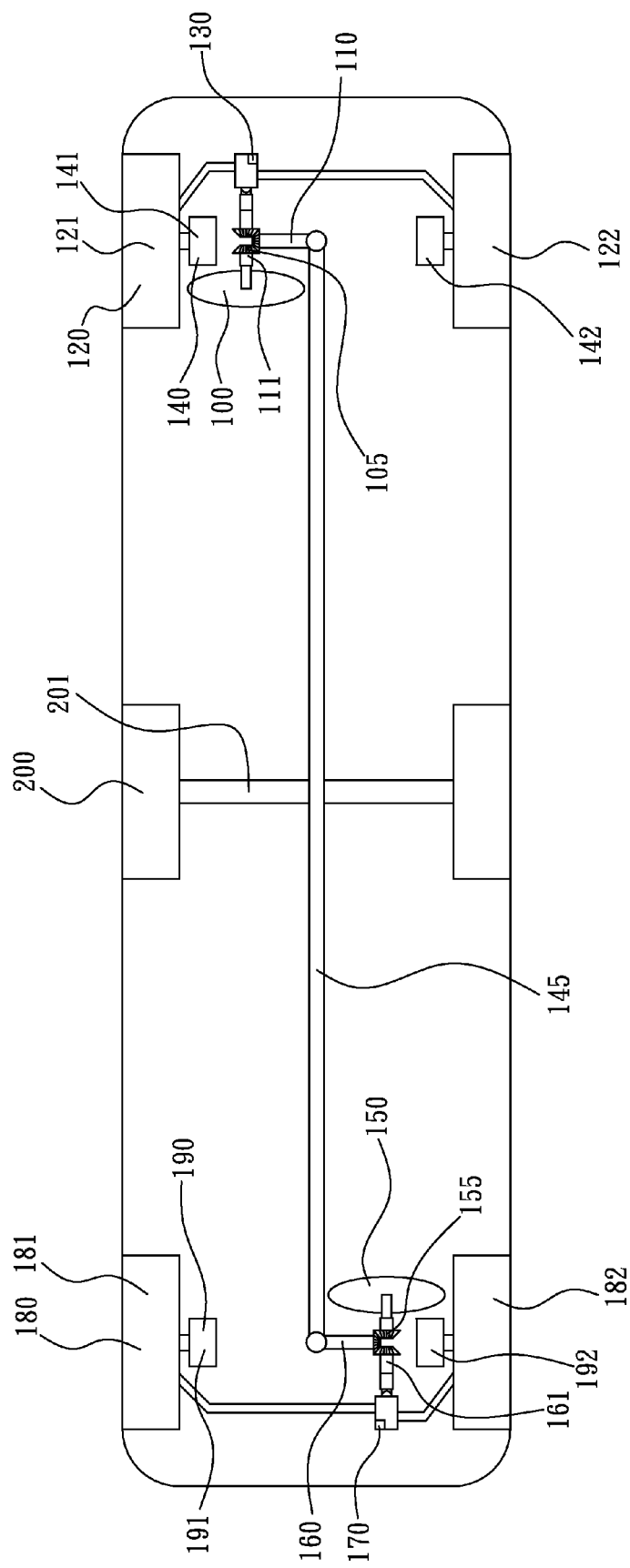
FIG. 6 schematically illustrates the top view of a transmission and steering system of a double-head vehicle according to another preferred embodiment of the present invention.
Figure 7:
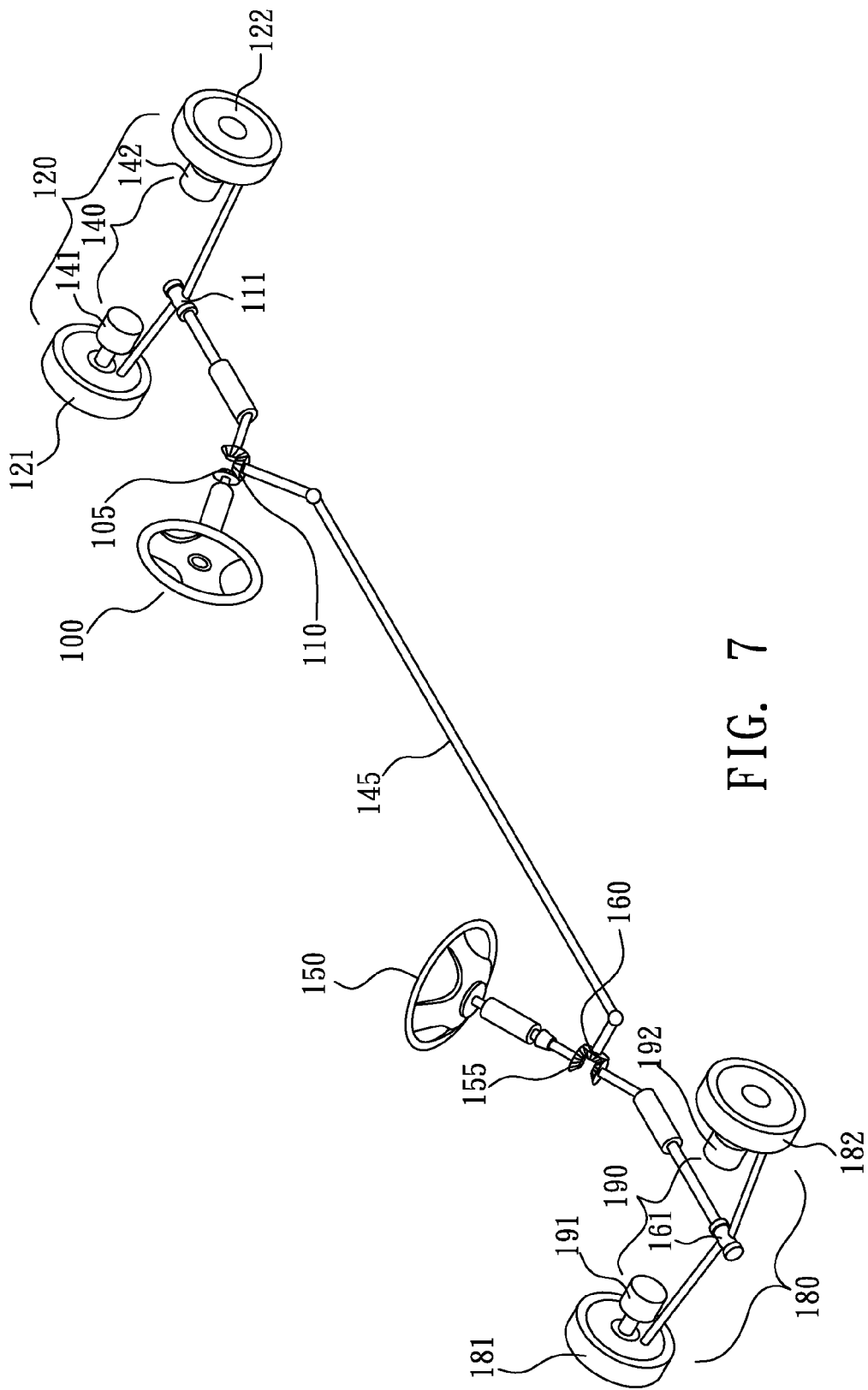
FIG. 7 schematically illustrates an enlarged local view of the first three-way axle 110 and the second three-way axle 160 according to the present invention.

With reference to FIGS. 6 and 7, FIG. 6 schematically illustrates the top view of a transmission and steering system of a double-head vehicle according to the present invention, and FIG. 7 schematically illustrates an enlarged local view of the first three-way axle 110 and the second three-way axle 160 according to the present invention.

With reference to the figures, a double-head lowrider vehicle, for example but not limited to electrical vehicle, according to the present invention comprises a first steering wheel 100; a first three-way axle 110, a front wheel group 120; a first motor group 140; a transmission shaft 145; a second steering wheel 150; a second three-way axle 160, a rear wheel group 180; a second motor group 190, wherein the first steering wheel 100 may control the front wheel group 120, which is a prior and will not be discussed further.

The first three-way gear group 105 coupled with the first steering wheel 100 may connect and drive the first steering wheel 100, the first three-way axle 110, and the transmission shaft 145 in three axial directions.

One axle of the first three-way axle 110 is coupled with the first steering wheel 100, which disposed with a turning center 111, and two other axles of the first three-way axle 110 are coupled with the two wheels of the front wheel group 120; to enable the rear wheel group 180 turning at the same time, a third axle (horizontal direction) is extended from the vertical axle at the center of the first steering wheel 100, and the vertical axle at the center of the first steering wheel 100 is cut into upper section and lower section and the first three-way gear group 105 is disposed at the cut-out section, such that the vertical axles, i.e. upper section and lower section, are connected through, and the third axle (horizontal direction) can be inserted. Consequently, if the upper section of the vertical axle (first axle for power input) of the first three-way axle 110 is rotated by 1.5 degrees, through the transmission of gears, the lower section of the vertical axle (the second axle for power output) will also be turned by 1.5 degrees to drive the front wheel group 120 to rotate; also the horizontal axle (third axle also for power output) will be turned by 1.5 degrees to drive the rear wheel group 180 to turn through the connection axle at the vehicle rear, which is a prior art and will not be discussed further.

The front wheel group 120 further comprises two wheels 121 and 122 which is connected with the first steering wheel 100 through the first three-way axle 110, wherein the first three-way axle 110 may transmit the information of steering angle of the first steering wheel 100 to the front wheel group 120, which is a prior art and will not be discussed further.

The first motor group 140 coupled with the front wheel group 120 further comprises a first stepper motor 141 and a second stepper motor 142 to drive the turning of the two wheels 121 and 122 of the front wheel group 120, wherein the first motor 141 and second motor 142 are, for example but not limited to, servo motors.

Two ends of the transmission shaft 145 are coupled with the first steering wheel 100, the first three-way axle 110, the second steering wheel 150, and the second three-way axle 160 so as to provide the mechanical transmission between the front wheel group 120 and the rear wheel group 180.

The second steering wheel 150 may control the rear wheel group 180, which is a prior art and will not be discussed further.

The second three-way gear group 155 is coupled with the second steering wheel 150 so as to provide the connection and transmission of the second steering wheel 150, the second three-way axle 160, and the transmission shaft 145 in three axial directions.

One axle of the second three-way axle 160 is coupled with the second steering wheel 150, which has a turning center 161, and the other two axles are coupled with the two wheels of the rear wheel group 180, which is a prior art and will not be discussed further.

The rear wheel group 180 is connected with the second steering wheel 150 through the other two axles of the second three-way axle 160, and further has two wheels 181 and 182.

The second motor group 190 coupled with the rear wheel group 180 further comprises a third motor 191 and a fourth motor 192 to drive the turning of the two wheels 181 and 182 of the rear wheel group 180, wherein the first third motor 191 and the fourth motor 192 are, for example but not limited to, servo motors.

As described earlier, the steering of the front wheel group 120 and the rear wheel group 180 may be in same or opposite phase, whose principle can be seen in the aforementioned description and will not be repeated here.

Furthermore, a transmission and steering system of a double-head vehicle according to the present invention further comprises a middle wheel group 200, which is disposed between the front wheel group 120 and the rear wheel group 180 and which is connected with a power axle 201 therebetween. Also, when a double-head lowrider vehicle according to the present invention is turning, the front wheel group 120, the middle wheel group 200, and the rear wheel group 180 have a common center at the extension line of the middle wheel group 200.

Consequently, with the implementation of a transmission and steering system of a double-head vehicle according to the present invention, the first signal acquisition and transceiver device may be disposed at the front wheel group and the second signal acquisition and transceiver device may be disposed at the rear wheel group such that when the steering wheel is turned, the electric motor may receive the steering signal transmitted from the first signal acquisition and transceiver device to drive the rear wheel group to turn as well as the advantage of driving through both heads can be achieved. Therefore, the present invention can indeed overcome the drawbacks of prior vehicle structures.

It is appreciated that although the directional practice device of the present invention is used in a very limited space instead of practicing at the real playing field, effective and steady practice can be obtained as well. Further, it is very easy to set up and to operate the directional practice device of the present invention. These advantages are not possible to achieve with the prior art.

While the invention has been described with reference to the a preferred embodiment thereof, it is to be understood that modifications or variations may be easily made without departing from the spirit of this invention, which is defined by the appended claims.

What is claimed is:

1. A transmission and steering system of a double-head vehicle, comprising
    a first steering wheel to control the front wheel group described later;
    a front wheel group which is connected with the first steering wheel through a four-bar linkage;
    a first signal acquisition and transceiver device which is coupled with the turning center of the four-bar linkage and may output the steering information according to the steering angle of the first steering wheel;
    a first motor group coupled with the front wheel;
    a second signal acquisition and transceiver device which may receive the steering information output from the first signal acquisition and transceiver device;
    a rear wheel group which is coupled with the second signal acquisition and transceiver device and has a second four-bar linkage; and
    a second motor group coupled with the second four-bar linkage, the second signal acquisition and transceiver device, and the rear wheel group;
    such that the first steering wheel is turned, the first motor group may be controlled by the first steering wheel to drive the front wheel group to turn and in the mean time, the second signal acquisition and transceiver device may receive the steering information and transmit it to the second motor group to drive the rear wheel group.

2. The transmission and steering system of a double-head vehicle as claimed in claim 1, wherein the first and the second signal acquisition and transceiver devices may transmit steering information through wire or wireless manner.

3. The transmission and steering system of a double-head vehicle as claimed in claim 1, further comprising a first three-way gear group coupled with the first steering wheel group may connect and drive the first steering wheel and the first three-way axle in three axial directions.

4. The transmission and steering system of a double-head vehicle as claimed in claim 1, wherein the first motor group further comprises a first motor and a second motor, and the second motor group further comprises a third motor and a second motor, and the first motor, the second motor, the third motor group, and the fourth motor may be servo motors.

5. The transmission and steering system of a double-head vehicle as claimed in claim 3, wherein the first motor group may also be a motor and may be disposed under the first three-way gear group, and the motor may be a servo motor.

6. The transmission and steering system of a double-head vehicle as claimed in claim 1, further comprising a middle wheel group, which is disposed between the front wheel group and the rear wheel group, and which is connected with a power shaft therebetween.

7. The transmission and steering system of a double-head vehicle as claimed in claim 1, wherein the steering of the front wheel group and the rear wheel group may be in same phase.

8. The transmission and steering system of a double-head vehicle as claimed in claim 1, wherein the steering of the front wheel group and the rear wheel group may be in opposite phase.

9. The transmission and steering system of a double-head vehicle as claimed in claim 4, wherein when turning, the front wheel group, the middle wheel group, and the rear wheel group have a common center at the extension line of the middle wheel group.

10. The transmission and steering system of a double-head vehicle as claimed in claim 1, wherein the vehicle may be an electric vehicle.

11. The transmission and steering system of a double-head vehicle as claimed in claim 1, further comprising a second steering wheel and a second three-way gear group, which are connected with the rear wheel group through the second four-bar linkage, which may control the rear wheel group.

12. A transmission and steering system of a double-head vehicle, comprising
- a first steering wheel to control the front wheel group described later;
- a first three-way gear group which is coupled with the first steering wheel and can connect and drive the first steering wheel, the first three-way axle described later, and the transmission shaft described later in three axial directions;
- a first three-way axle whose one axle is coupled with the first three-way gear group and which has a turning center;
- a front wheel group which is connected with the first steering wheel through the other two axles of the first three-way axle;
- a first motor group coupled with the front wheel group; a transmission shaft whose one end is coupled with the first steering wheel and the first three-way axle;
- a second steering wheel controlling the rear wheel group described later;
- a second three-way gear group which is coupled with the second steering wheel and can connect and drive the second steering wheel, the second three-way axle described later, and the transmission shaft described later in three axial directions;
- a second three-way axle whose one axle is coupled with the second three-way gear group and which has a turning center;
- a rear wheel group which is connected with the second steering wheel through the other two axles of the second three-way axle;
- a second motor group coupled with the rear wheel group; such that when the first steering wheel is turned, the first motor group may be controlled by the first steering wheel to drive the front wheel group to turn and in the mean time, the transmission shaft may rotate and transmit to the second motor group and to drive the rear wheel group; wherein a first and a second signal acquisition and transceiver devices transmits steering information through wire or wireless manner.

13. The transmission and steering system of a double-head vehicle as claimed in claim 12, wherein the first motor group further comprises a first motor and a second motor, and the second motor group further comprises a third motor and a second motor, and the first motor, the second motor, the third motor group, and the fourth motor may be servo motors.

14. The transmission and steering system of a double-head vehicle as claimed in claim 12, further comprising a middle wheel group, which is disposed between the front wheel group and the rear wheel group, and which is connected with a power shaft therebetween.

15. The transmission and steering system of a double-head vehicle as claimed in claim 12, wherein the steering of the front wheel group and the rear wheel group may be in same or opposite phase.

16. The transmission and steering system of a double-head vehicle as claimed in claim 12, wherein when turning, the front wheel group, the middle wheel group, and the rear wheel group have a common center at the extension line of the middle wheel group.

17. The transmission and steering system of a double-head vehicle as claimed in claim 12, wherein the vehicle may be an electric vehicle.

* * * * *